United States Patent [19]

Hoxmeier

[11] Patent Number: 4,879,349

[45] Date of Patent: Nov. 7, 1989

[54] SELECTIVE HYDROGENATION PROCESS

[75] Inventor: Ronald J. Hoxmeier, Houston, Tex.

[73] Assignee: Shell Oil Company, Houston, Tex.

[21] Appl. No.: 116,981

[22] Filed: Nov. 5, 1987

[51] Int. Cl.$^4$ .............................................. C08F 8/04
[52] U.S. Cl. ................................. 525/332.8; 525/338; 525/339
[58] Field of Search ...................... 525/338, 339, 332.8

[56] References Cited

U.S. PATENT DOCUMENTS

| | | | |
|---|---|---|---|
| 3,113,986 | 12/1963 | Breslow et al. | 260/683.9 |
| 3,135,716 | 7/1964 | Uraneck et al. | 260/45.5 |
| 3,150,209 | 9/1964 | Short et al. | 260/894 |
| 3,231,635 | 1/1966 | Holden et al. | 260/880 |
| 3,265,765 | 12/1941 | Schultz et al. | 200/126 |
| 3,322,856 | 5/1967 | Holden et al. | 260/876 |
| 3,333,024 | 4/1963 | Haefele et al. | 260/880 |
| 3,465,063 | 9/1969 | Hassell et al. | 260/876 |
| 3,496,154 | 2/1970 | Wofford | 260/84.7 |
| 3,498,960 | 3/1970 | Wofford | 260/84.7 |
| 3,541,064 | 11/1970 | Yoshimoto et al. | 260/85.1 |
| 3,595,942 | 7/1971 | Wald et al. | 260/880 |
| 3,634,549 | 1/1977 | Shaw et al. | 260/880 B |
| 3,644,588 | 2/1972 | Hassell | 260/879 |
| 3,670,054 | 6/1972 | De La Mare et al. | 260/880 B |
| 3,700,633 | 10/1972 | Wald et al. | 260/880 B |
| 3,700,748 | 10/1972 | Winkler | 260/879 |
| 3,868,354 | 2/1975 | Halasa | 525/339 |
| 3,882,094 | 5/1975 | Halasa et al. | 525/338 |
| 3,899,474 | 8/1975 | Goldenberg et al. | 525/339 |
| 3,937,759 | 2/1976 | Baumgartner et al. | 260/879 |
| 3,965,019 | 6/1976 | St. Clair et al. | 252/59 |
| 4,028,485 | 6/1977 | Poloso et al. | 528/486 |
| 4,145,298 | 3/1979 | Trepka | 252/51.5 A |
| 4,328,202 | 5/1982 | Gries et al. | 424/5 |

FOREIGN PATENT DOCUMENTS 1558491 8/1976 United Kingdom .

Primary Examiner—Joseph L. Schofer
Assistant Examiner—Bernard Lipman

[57] ABSTRACT

A method for selectively hydrogenating a polymer containing monomer units from at least two different conjugated diolefins, one of which conjugated diolefins is more substituted at the 2, 3 and/or 4 carbon atoms than is the other. The selective hydrogenation can be accomplished with selective hydrogenation catalysts known in the prior art at selected conditions such that ethylenic unsaturation incorporated into the polymer from the lesser substituted conjugated diolefin is hydrogenated while at least a portion of the ethylenic unsaturation incorporated into the polymer by the more substituted conjugated diolefin remains unsaturated. The polymer containing monomer units from at least two different conjugated diolefins may also contain one or more other monomers, particularly monoalkenyl aromatic hydrocarbon monomers. The hydrogenated polymer may be random, tapered or block. The hydrogenated polymers, which will contain a controlled amount of residual ehtylenic unsaturation in the conjugated diolefin portion, may be used in any application in which a completely hydrogenated polymer would be useful. Moreover, the selectively hydrogenated polymer of this invention may be used in compositions where polymers capable of cross-linking through ethylenic unsaturation are required. The selectively hydrogenated polymer of this invention may also be functionalized using methods requiring reaction with ethylenic unsaturation.

36 Claims, No Drawings

SELECTIVE HYDROGENATION PROCESS

BACKGROUND OF THE INVENTION

1. Field of the Invention

This invention relates to a method for hydrogenating ethylenically unsaturated polymers and to polymeric materials thus hydrogenated. More particularly, this invention relates to a method for selectively hydrogenating ethylenically unsaturated polymeric materials and to the selectively hydrogenated products produced in such a process.

2. Prior Art

Heretofore, several processes have been proposed for hydrogenating polymers containing ethylenic unsaturation. The polymers actually hydrogenated may contain only ethylenic unsaturation such as taught, for example, in U.S. Pat. No. 3,465,063 or the polymers may contain both ethylenic and aromatic unsaturation as taught, for example, in U.S. Pat. Nos. 3,113,986; 3,333,024; 3,595,942; 3,634,549; 3,644,588; 3,670,054; 3,700,633 and Re. 27,145. When the polymer subjected to hydrogenation contains both ethylenic and aromatic unsaturation, the hydrogenation may be accomplished such that a significant portion of both the ethylenic and aromatic unsaturation is converted as taught, for example, in U.S. Pat. Nos. 3,113,986; 3,595,942 and 3,700,633 or the hydrogenation may be completed selectively such that a significant portion of the ethylenic unsaturation is converted while little or no aromatic unsaturation is converted as taught, for example, in U.S. Pat. Nos. 3,634,549; 3,670;054 and Re. 27,145. The processes heretofore proposed are, or at least can be selective as between ethylenic (and acetylenic) unsaturation and aromatic unsaturation. The processes heretofore proposed, however, are not considered selective as between the various types of ethylenic unsaturation as indicated, for example, in U.S. Pat. No. 3,670,054 wherein it is indicated that isoprene segments are, generally, hydrogenated to approximately the same extent during hydrogenation as are butadiene segments.

While the hydrogenation processes heretofore proposed have, generally, been quite effective in producing polymeric materials having improved weatherability (ozone and oxygen resistance) and thermal stability, these processes, generally, cannot be operated so as to permit the retention of a controlled amount of ethylenic unsaturation, particularly in an elastomeric segment of a polymer even though the hydrogenation can be stopped and restarted as taught in U. S. Pat. No. 3,937,759. In fact, the hydrogenation processes heretofore proposed frequently result in substantially complete conversion of all ethylenic unsaturation contained in a polymer. As a result, hydrogenated polymers produced with the hydrogenation processes heretofore proposed cannot, frequently, effectively be used in polymeric compositions wherein curing is effected through crosslinking requiring ethylenic unsaturation. Moreover, such polymers cannot, effectively, be functionalized using techniques requiring residual ethylenic unsaturation. The need, then, for an improved method for hydrogenating polymeric materials containing ethylenic unsaturation which will permit the retention of a controlled amount of unsaturation in the polymer is believed to be readily apparent.

SUMMARY OF THE INVENTION

It has now been discovered that the foregoing and other disadvantages of the prior art hydrogenation processes can be avoided, or at least significantly reduced, with the hydrogenation process of this invention. It is, therefore, an object of this invention to provide an improved process for hydrogenating polymeric materials containing ethylenic unsaturation. It is another object of this invention to provide such a process which can be used to produce polymers having a controlled amount of ethylenio unsaturation in the polymer after the hydrogenation is completed. It is still another object of this invention to provide partially hydrogenated polymeric materials containing a controlled amount of ethylenic unsaturation. The foregoing and other objects and advantages will become apparent from the description of the invention set forth hereinafter and from the examples contained therein.

In accordance with the present invention, the foregoing and other objects and advantages are accomplished by incorporating a controlled amount of ethylenic unsaturation into the polymer, which ethylenic unsaturation will be more sterically hindered than certain other ethylenio unsaturation contained in the polymer, and thereafter hydrogenating the polymeric material at conditions sufficient to effect hydrogenation of at least a portion of the ethylenio unsaturation in the polymer which is less sterically hindered without hydrogenating at least a portion of the ethylenic unsaturation which is more sterically hindered. The ethylenic unsaturation which is converted (saturated) as a result of hydrogenation may be provided with a substituted or unsubstituted conjugated diolefin. The ethylenic unsaturation which is not hydrogenated will be provided with one or more conjugated diolefins that are substituted and that are more substituted, particularly on one or both of the carbon atoms containing the resulting double bond than was the conjugated diolefin or diolefins which provided the ethylenio unsaturation which is converted as a result of hydrogenation. The hydrogenation may be accomplished in the presence of any of the hydrogenation catalysts known in the prior art to be effective for selectively hydrogenating polymeric materials containing both ethylenic and aromatic unsaturation but these catalysts will be used at lower concentrations than have, generally, heretofore been used. Lower hydrogen partial pressures during hydrogenation and lower hydrogenation temperatures may also be used to enhance the selectivity but lower hydrogen partial pressures and lower temperatures are not essential to obtaining the desired hydrogenation selectivity.

DETAILED DESCRIPTION OF THE INVENTION

As indicated supra, the present invention is drawn to an improved process for hydrogenating polymers containing ethylenic unsaturation and to the hydrogenated products produced via this process. The improved process enables control of the amount of ethylenic unsaturation remaining in the polymer after the hydrogenation is completed. The products obtained with the process will contain a controlled amount of ethylenic unsaturation. The desired control over the extent of hydrogenation is accomplished by incorporating a controlled amount of ethylenic unsaturation into the polymer with a conjugated diolefin which is substituted at the 2, 3 and/or 4 carbon atoms thereof with a radical or radicals which will render a double bond incorporated into the polymer between the 2 and 3 carbon atoms (1,4-addition) and/or the 3 and 4 carbon atoms (1,2-addition) more sterically hindered than is the corresponding ethylenic unsaturation which is to be hydrogenated. For convenience, a conjugated diolefin will be defined as substituted herein at a designated carbon atom or atoms when (1) that carbon atom has no hydrogen atom or atoms bonded thereto, (2) the hydrogen atom or atoms is replaced with a radical which is sufficiently large as to sterically hinder hydrogenation of any double bond containing that carbon atom and (3) the double bond imparted into the polymer and containing the designated carbon atom does not also contain a carbon atom having two hydrogen atoms bonded thereto. A conjugated diolefin will be defined herein as unsubstituted at a designated carbon atom or atoms when that carbon atom has one or more hydrogen atoms bonded thereto or when the designated carbon atom is, ultimately, contained in a double bond containing a carbon atom having two hydrogen atoms bonded thereto. A carbon atom is, then, herein referred to as unsubstituted if a double bond imparted into a polymer and containing the designated carbon atom is a Type I ethylenio unsaturation.

As is well known in the prior art, 1,3-conjugated diolefins can be incorporated into a polymer chain either through 1,4-addition or 1,2-addition. When the conjugated diolefin is incorporated via 1,4-addition the unsaturation incorporated into the polymer will be contained in the polymer backbone and between the 2 and 3 carbon atoms, as indicated above, of the conjugated diolefin added into the polymer. When the conjugated diolefin enters the chain through 1,2-addition, on the other hand, the ethylenic unsaturation incorporated into the polymer will be between the 3 and 4 carbon atoms, as also indicated above, and external relative to the polymer baokbone. It will, of course, be appreciated by those skilled in the art that some conjugated diolefins, such as isoprene, sometimes add into the polymer via 3,4-addition rather than via 1,2-addition. In these cases, the unsatura&ion will be between the 1 and 2 carbon atoms of the conjugated diolefin and external of the polymer backbone. All general reference to 1,2-addition herein should then be construed to include 3,4-addition if such addition does or could occur. As is also well known, 1,4-addition is favored when conjugated diolefins are polymerized unless steps are taken to alter the normal distribution as between 1,2- and 1,4-addition, such as the incorporation of a polar compound during polymerization. In general the relative distribution as between 1 2- and 1 4addition is independent of polymerization conditions.

The essence of the present invention resides in the discovery that ethylenic unsaturation contained in a polymer having at least one hydrogen atom bonded to each of the carbon atoms containing the double bond (ethylenio unsaturation) or two hydrogen atoms on one of t he carbons contained in the double bond (ethylenic unsaturation) hydrogenate more readily than ethylenic unsaturation containing less than one hydrogen atom bonded to either or both of the carbon atoms contained in the ethylenio unsaturation and that ethylenic unsaturation containing only one hydrogen atom bonded to one of the two carbon atoms contained in the double bond will hydrogenate more readily than ethylenio unsaturation containing no hydrogen atoms bonded to either of the carbon atoms contained in the double bond. The essence of the present invention, then, resides in the discovery that selective hydrogenation can be achieved as between each of three different types of ethylenic unsaturation; viz., that type having at least two hydrogen atoms in the double bond structure, that type containing a single hydrogen atom in the double bond structure and that type having no hydrogen atoms in the double bond. For convenience, these three types of ethylenic unsaturation will frequently be referred to hereinafter as Type I, Type II and Type III, respectively. The three types of ethylenic unsaturations may be represented structurally by the following general formulae:

Type I = $RCH=CH_2$; $R_2C=CH_2$ and $RCH=CHR$
Type II = $RXC=CHR$ and $RCH=CRX$; and
Type III = $RXC=CRX$ Wherein:
Each R may, independently, be the same or a different hydrocarbyl radical containing at least 1 carbon atom, which hydrocarbyl radical may be a segment of the polymer containing the ethylenic unsaturation; and each x may independently be the same or a different hydrocarbyl radical containing at least one carbon atom or some other radical capable of hindering a hydrogenation reaction.

As will be apparent to those skilled in the polymer arts those double bonds containing two hydrogen atoms bonded to a single carbon atom contained in the double bond can be incorporated into a polymer with a conjugated diolefin only through 1,2- or 3,4-addition of the conjugated diolefin. All other double bonds illustrated may, however, be incorporated into the polymer via 1,2-, 3,4- and 1,4-addition of a conjugated diolefin. In general, the driving force required to effect hydrogenation of the three types of ethylenic unsaturation is as follows:

$$I < II < < III.$$

That is, Type I is more readily hydrogenated than Type II and substantially more readily hydrogenated than Type III. Type II is also substantially more readily hydrogenated than Type III.

Consistent with the foregoing, it has been discovered that hydrogenation conditions can be selected such that a substantial portion of Type I ethylenic unsaturation imparted into a polymer via 1,4-addition of a conjugated diolefin which is unsubstituted on both the 2 and 3 carbon atoms thereof as well as Type I ethylenic unsaturation imparted into the polymer via 1,2-addition of a conjugated diolefin which is unsubstitu&ed at the 3 and 4 carbon atoms (i.e., both the 3 and 4 carbon atoms have at least one hydrogen atom bonded thereto or the 4 carbon atom has at least two hydrogen atoms bonded thereto) can be hydrogenated while Type II ethylenio unsaturation imparted via 1.4-addition of a conjugated diolefin which is substituted at either the 2 or 3 carbon atom as well as Type II ethylenic unsaturation imparted via 1,2-addition of a conjugated diolefin which is substituted at the 3 or 4 carbon atom thereof is not hydrogenated. It will, of course, be appreciated that Type II ethylenic unsaturation will not be imparted into a polymer with a conjugated diolefin having two hydrogen atoms bonded to the 4 carbon atom. Similarly, hydrogenation conditions can be selected such that a substantial portion of Type II ethylenic unsaturation contained in a polymer is hydrogenated while Type III ethylenic unsaturation imparted via 1,4 addition of a conjugated diolefin which is substituted on both the 2 and 3 carbon atoms as well as Type III ethylenic unsaturation imparted via 1,2-addition of a conjugated diolefin which is substituted on both the 3 and 4 carbon atoms is not hydrogenated. Further, hydrogenation conditions can be selected such that a substantial portion of the Type I ethylenic unsaturation is hydrogenated while any Type III ethylenic unsaturation contained in the polymer is not.

The amount of ethylenic unsaturation remaining in the polymer after hydrogenation can, then, be controlled by controlling the amount of each type of ethylenio unsaturation incorporated into the polymer or the amount of monomer imparting the various types of ethylenic unsaturation. Consideration must, however, be given to the relative amount of monomer incorporated via both 1,2- or 3,4-addition and 1,4-addition and the structure of the ethylene unsaturation incorporated into the polymer via each of these types of addition. In this regard, if all of the conjugated diolefin monomers which are copolymerized are such that each imparts only Type I ethylenio unsaturation into the polymer external of the backbone; i.e., via 1,2-addition, only ethylene unsaturation incorporated via 1,4-addition of a substituted or more substituted monomer will remain unsaturated after hydrogenation. Should any of the conjugated diolefin monomers copolymerized be substituted such that the ethylenio unsaturation incorporated into the polymer external of the polymer backbone via 1,2-addition is either Type II or Type III, this unsaturation may also remain unsaturated after hydrogenation is complete. To effectively control the amount of ethylene unsaturation remaining in the polymer after the hydrogenation is complete, then it will be necessary to know the relative 1,2-, 3,4- and 1,4-addition of the monomers copolymerized and the type of ethylenio unsaturation incorporated into the polymer via each of the types of addition. In controlling the amount of ethylene unsaturation remaining after hydrogenation is complete, consideration also must be given to the fact that some of both the Type I and/or Type II ethylenic unsaturation intended to be converted (saturated) during hydrogenation may remain unconverted (unsaturated) while some of the Type II ethylenic unsaturation intended to remain unsaturated after hydrogenation is complete may become converted (saturated) during hydrogenation. The exact amount of Type II unsaturation that is converted and Type I and Type II that remains unconverted is controlled primarily by the amount of catalyst actually used during hydrogenation although the hydrogenation temperature actually used during hydrogenation can have some influence on the values as can the hydrogen partial pressure used during hydrogenation. In general, however, the amount of Type I and/or Type II ethylenic unsaturation that remains unconverted when such conversion is desired as well as the amount of Type II ethylenic unsaturation that is converted when such conversion was not desired is minor. As a result, the amount of unsaturation remaining after hydrogenation will at least closely approximate the amount of unsaturation of the type or types incorporated into the polymer for purposes of controlling the residual unsaturation as was present before hydrogenation. For example, a polymer containing about 90% Type I ethylenio unsaturation and about 10% Type II ethylenic unsaturation before hydrogenation will contain about 10% residual unsaturation after hydrogenation at conditions which were selected so as to hydrogenate Type I ethylenic unsaturation without hydrogenating Type II ethylenic unsaturation. Generally, all of the Type III ethylenio unsaturation imparted into the polymer will remain unsaturated after hydrogenation.

In general, any polymer containing ethylenio unsaturation having at least one hydrogen atom associated with at least one of the two carbon atoms contained in the ethylenio unsaturation impated into the polymer can be modified so as to incorporate ethylenic unsaturation which is more difficult to hydrogenate and then hydrogenated to produce a selectively hydrogenated polymer containing a controlled amount of residual ethylenio unsaturation. The hydrogenation method of this invention is particularly useful for selectively hydrogenating polymers containing conjugated diolefin monomer units, which polymers will contain at least two different polymerized conjugated diolefin monomers one containing less total substitution on the 2 and 3 carbon atoms and/or the 3 and 4 carbon atoms than the other conjugated diolefin monomer. The polymers containing conjugated diolefin monomer units which may be hydrogenated with the method of this invention may also contain other polymerized monomer particularly one or more monoalkenyl aromatic hydrocarbon monomers. The polymers containing conjugated diolefin monomer units which may be hydrogenated using the method of the present invention may be random, tapered or block.

Unsubstituted, linear conjugated diolefins will contain the least amount of substitution on any of the carbon atoms thereby yielding Type I ethylenic unsaturation when polymerized via 1,2-, 3,4- or 1,4-addition, and when copolymerized with a 2 or 3 mono-substituted or a 2,3-disubstituted conjugated diolefin will yield a polymer which can be selectively hydrogenated such that a substantial portion (substantially all) of the Type I ethylenic unsaturation is hydrogenated while a substantial portion (substantially all) of the ethylenic unsaturation imparted into the polymer via 1,4-addition of the substituted conjugated diolefin (yielding Type II or Type III ethylenic unsaturation) will remain unconverted or unsaturated after the hydrogenation is complete. Moreover, when a conjugated diolefin substituted on both the 2 and 3 or 3 and 4 carbon atoms is copolymerized with an unsubstituted conjugated diolefin, hydrogenation conditions may be selected such that a substantial portion (substantially all) of the ethylenic unsaturation imparted into the polymer as a result of 1,2-addition of the more substituted conjugated diolefin (again yielding Type II or Type III ethylenic unsaturation) remains unsaturated after the hydrogenation is complete.

Similarly, a conjugated diolefin which is monosubstituted at either the 2 or 3 carbon atom may be copolymerized with a conjugated diolefin that is substituted on both the 2 and 3 carbon atoms to produce a polymer which may be selectively hydrogenated such that a substantial portion (substantially all) of any Type I and Type II ethylenic unsaturation imparted into the polymer is hydrogenated and about 100% of the ethylenic unsaturation imparted into the polymer as a result of 1,4-addition of the di-substituted conjugated diolefin (Type III ethylenic unsaturation) remains unconverted or unsaturated after the hydrogenation is complete. This is due, of course, to the fact that the Type III ethylenic unsaturation is extremely difficult to hydrogenate using the catalyst contemplated for use in the method of this invention.

Further, an unsubstituted conjugated diolefin, which will yield Type I ethylenic unsaturation, may be copolymerized with a conjugated diolefin which is substituted on either the 3 or the 4 carbon atoms or substituted in both the 3 and 4 carbon atoms so as to produce a polymer containing Type II and/or Type III ethylenic unsaturation may be selectively hydrogenated such that a substantial portion (substantially all) of the ethylenic unsaturation imparted into the polymer via 1,2-addition of the substituted conjugated diolefin will remain unsaturated after the hydrogenation is complete. Similarly, a conjugated diolefin which is substituted on either the 3 or 4 carbon atoms may be copolymerized via 1,2-addition, so as to yield a polymer containing Type II ethylenic unsaturation, with a conjugated diolefin which is substituted on both the 3 and 4 carbon atoms, also via 1,2-addition, so as to Yield a polymer containing Type III ethylenic unsaturation, which polymer may be selectively hydrogenated.

In general, when the copolymerization is accomplished such that a significant portion of the conjugated diolefins polymerize via 1,4-addition of the conjugated diolefins, conjugated diolefins substituted at either the 2 or 3 carbon atom or both may be used to control the amount of residual unsaturation remaining after hydrogenation while when the polymerization is accomplished such that a majority of the conjugated diolefins polymerized via 1,2-addition conjugated diolefins which are substituted at either the 3 or 4 position or at both the 3 and 4 positions will be used to control the amount of residual unsaturation after the hydrogenation has been completed. In certain cases, of course, conjugated diolefin monomers could be selected that would permit hydrogenation of the resulting polymer such that all unsaturation imparted by the more substituted monomer; i.e., that imparted by both 1,2- and 1,4-addition, would remain unsaturated after the hydrogenation is completed.

In general, the substitutions on the 2, 3 and 4 carbon atoms of a conjugated diolefin which will hinder hydrogenation may be any radical capable of hindering access to the ethylenic unsaturation by a metal or metal containing catalyst during hydrogenation. Suitable radicals include hydrocarbyl radicals having from 1 to about 10 carbon atoms, halogen atoms and the like. It is, however, important that the radical which will, generally, remain in the polymer after hydrogenation not adversely affect polymer properties. As a result, hydrocarbyl radicals containing from 1 to about 6 carbon atoms will preferably be used. Suitable hydrocarbyl radicals include straight and branched-chain alkyl radicals, cycloalkyl radicals, substituted-cycloalkyl radicals, aromatic radicals and the like. Straight and branched-chain alkyl groups are particularly preferred and alkyl groups containing from 1 to about 3 carbon atoms are most preferred.

Unsubstituted conjugated diolefins which will impart Type I ethylenic unsaturation into a polymer via 1,2-and 1,4-addition and which may be used in combination (copolymerized) with a substituted conjugated diolefin to prepare a polymer which may be selectively hydrogenated with the method of the present invention include 1,3-butadiene, 1,3-pentadiene (piperylene), 1,3-hexadiene, 1,3-heptadiene, 1,3-octadiene, and the like. Mono-substituted conjugated diolefins which may be copolymerized with unsubstituted conjugated diolefins and used to control the amount of ethylenic unsaturation remaining in the polymer after hydrogenation is complete include alkyl-substituted conjugated diolefins such as 2-methyl-1,3-butadiene (isoprene), 2-ethyl-1,3-butadiene, 2-methyl-1,3-pentadiene, 2-ethyl-1,3-pentadiene, 2-methyl-1,3-hexadiene, 2-ethyl-1,3-hexadiene, 2-methyl-1,3-heptadiene, 2-ethyl-1,3-heptadiene, 2-methyl-1,3-octadiene, 2-ethyl-1,3octadiene and the like. Mono-substituted conjugated dienes which may be copolymerized with an unsubstituted conjugated diene for the purpose of controlling the amount of residual unsaturation remaining in the polymer after hydrogenation is completed also include the 2-halogen-substituted conjugated dienes, particularly the 2-fluoro-substituted conjugated dienes. In general, and when a conjugated diolefin substituted at the 2 carbon atom is copolymerized with an unsubstituted conjugated diolefin, a substantial portion (substantially all) of that ethylenic unsaturation imparted as a result of 1,4-addition of the substituted conjugated diolefin into the polymer, which ethylenic unsaturation, will be of Type II, will remain unsaturated after hydrogenation of the polymer is complete while a substantial portion (substantially all) of that unsaturation imparted into the polymer via 1,4-addition of the unsubstituted conjugated diolefin and via 1,2-(or 3,4-)addition of both monomers will be of Type I and will be converted (saturated) after hydrogenation of the polymer is complete. Still other mono-substituted conjugated diolefins which may be copolymerized with an unsubstituted conjugated diolefin to effect control of residual unsaturation include 3-alkyl- and 3-halo-substituted conjugated diolefins such as 3-methyl-1,3-pentadiene, 3-ethyl-1,3-pentadiene, 3-methyl-1,3-hexadiene, 3-ethyl-1,3-hexadiene, 3-methyl-1,3heptadiene, 3-ethyl-1,3-heptadiene, 3-methyl-1,3-octadiene, 3-ethyl-1,3-octadiene, 3-fluoro-1,3-pentadiene, 3-fluoro-1,3-hexadiene, 3-fluoro-1,3-heptadiene, 3-fluoro-1,3-octadiene and the like. In general, both the ethylenic unsaturation imparted via 1,2- and 1,4-addition of a conjugated diolefin substituted at the 3 carbon atom will be of Type II and hydrogenation may be accomplished such that a substantial portion (substantially all) thereof will remain unsaturated after the polymer is hydrogenated.

Di-substituted conjugated diolefins which may be used in combination with either a conjugated diolefin which is unsubstituted on the 2, 3 or 4 carbon atoms or a conjugated diolefin which is substituted on either the 2, 3 or 4 carbon atom to control the amount of ethylenic unsaturation remaining in the polymer after hydrogenation include 2,3-dialkyl-substituted conjugated diolefins such as 2,3-di-methyl-1,3-butadiene, 2,3-diethyl-1,3-pentadiene, 2,3-di-methyl-1,3-hexadiene, 2,3-diethyl-1,3-heptadiene, 2,3-di-methyl-1,3-octadiene and the like and 2,3-fluoro-substituted conjugated diolefins such as 2,3-difluoro-1,3-butadiene, 2,3-difluoro-1,3-pentadiene, 2,3-difluoro-1,3-hexadiene, 2,3-difluoro-1,3-heptadiene, 2,3-difluoro-1,3-octadiene and the like. When a 2,3-di-substituted conjugated diolefin is used with an unsubstituted conjugated diolefin, hydrogenation conditions can be selected such that only the ethylenic unsaturation imparted into the polymer as a result of 1,4-addition of the di-substituted conjugated diolefin, which unsaturation would be Type III, remains unsaturated after hydrogenation of the polymer is completed. The conditions selected would be severe enough to hydrogenate the Type II ethylenic unsaturation imparted into the polymer by 1,2addition of the 2,3-di-substituted conjugated diolefin. Hydrogenation conditions can however, also be selected such that the ethylenic unsaturation imparted into the polymer via both 1,2- and 1,4-addition of the di-substituted conjugated diolefin remains unsaturated after the hydrogenation is completed. In this latter case, the hydrogenation conditions selected would be those necessary to hydrogenate only the Type I ethylenic unsaturation imparted into the polymer via polymerization of an unsubstituted conjugated diolefin. It will, of course, be appreciated that certain conjugated diolefins containing at least 5 linear carbon atoms which are mono-substituted at the 4 carbon atom could also be copolymerized with an unsubstituted conjugated diolefin to produce a conjugated diolefin polymer which may be selectively hydrogenated. In this case, however, the ethylenic unsaturation which would remain unsaturated after the polymer has been hydrogenated would be the Type II ethylenic unsaturation imparted as a result of 1,2-addition of the substituted conjugated diolefin into the polymer. Useful substitutions on the 4 carbon atom would be the same as those which could be made on the 2 and 3 carbon atoms. Similarly, a conjugated diolefin containing at least 5 linear carbon atoms which is substituted in both the 3 and 4 positions could be copolymerized with either an unsaturated conjugated diolefin or a mono-substituted conjugated diolefin to produce a polymer which could be selectively hydrogenated. In such a polymer, hydrogenation conditions could be selected such that only that ethylenio unsaturation imparted as the result of 1,2addition of the di-substituted conjugated diolefin (Type III) into the polymer would remain unhydrogenated after the polymer has been hydrogenated. Conditions could also be selected, however, such that only the Type I ethylenio unsaturation would be hydrogenated during hydrogenation of the polymer.

As indicated supra, the polymers which can be selectively hydrogenated with the process of this invention will be copolymers comprising monomer units of at least two different conjugated diolefins each having a different number of substituents on either the 2 and 3 carbon atoms or the 3 and 4 carbon atoms. The polymers may, however, also contain other monomers, particularly one or more monoalkenyl-substituted aromatic hydrocarbon monomers. Suitable monoalkenyl aromatic hydrocarbon monomers which may be copolymerized into the polymer include styrene, various alkyl-substituted styrenes, various alkoxy-substituted styrenes, vinyl naphthalene, vinyl toluene and the like. The method of the present invention is particularly suited to the selective hydrogenation of polymers containing at least two different conjugated diolefins and at least one monoalkenyl-substituted aromatic hydrocarbon monomer since the relatively mild hydrogenation conditions selected so as to hydrogenate less than all of the ethylenic unsaturation incorporated into the polymer by addition of the conjugated diolefins will be sufficiently mild to ensure that none of the aromatic unsaturation is hydrogenated.

In general, polymers which may be hydrogenated with the process of this invention may be prepared using techniques well known in the prior art. For example, suitable polymers may be prepared using bulk or emulsion technology, generally, with a free radical initiator or in solution using an anionic initiator. Methods wherein an anionic initiator is used to prepare similar polymers are taught, for example, in U S. Pat. Nos. 3,135,716; 3,150,209; 3,496,154; 3,498,960; 4,145,298 and 4,238,202, the disclosure of which patents are herein incorporated by reference. Methods for preparing block copolymers with anionic initiators are also taught, for example, in U. S. Pat. Nos. 3,231,635; 3,265;765 and 3,322,856, the disclosure of which patents are also herein incorporated by reference.

In general, and when an anionic initiator is used, polymers containing monomer units of at least two different conjugated diolefins which may be hydrogenated in the method of the present invention will be prepared by contacting the monomers with an organoalkali metal compound in a suitable solvent at a temperature within the range from about -150° C. to about 300° C., preferably at a temperature within the range from about 0° C. to about 100° C. Particularly effective polymerization initiators are organolithium compounds having the general formula:

$$RLi_n$$

Wherein:
R is an aliphatic, cycloaliphatic or aromatic hydrocarbon radical having from one to about 20 carbon atoms; and
n is an integer of 1 to 4.

In general, and when the polymer is to be tapered, all monomer will be added at the same time initially. When the polymer is to be random, however, it will be necessary to either slowly add the faster polymerizing monomer or to combine all of the monomer with a randomizing agent. When the polymer is to be block, on the other hand, the monomers will be added sequentially. In general, conjugated diolefin polymers which may be hydrogenated with the method of the present invention may have weight-average molecular weights within the range from about 2000 to about 500,000. When the polymer is a block copolymer comprising one or more polymeric blocks containing monoalkenyl aromatic hydrocarbon monomer units and one or more conjugated diolefin blocks, the monoalkenyl aromatic hydrocarbon polymer blocks will, generally, have a weight-average molecular weight within the range from about 2,000 to about 125,000 and the conjugated diolefin blocks will have a weight-average molecular weight within the range from about 5,000 to about 150,000. When the polymer is a block copolymer, each of the conjugated diolefins contained in the polymer may form a separate block or the two or more conjugated diolefins may be copolymerized to form either a random or tapered polymeric block.

In general the conjugated diolefin polymers which are hydrogenated in the method of the present invention will contain a sufficient amount of conjugated diolefin having a higher degree of substitution on either the 2, 3 or 4 carbon atoms, the 2 and 3 carbon atoms or the 3 and 4 carbon atoms to permit control of the residual unsaturation; i.e., that is the amount of ethylenic unsaturation remaining in the polymer after hydrogenation thereof, within the range from about 1% to about 40% of that which was contained in the polymer prior to hydrogenation. The amount of residual unsaturation will, then, in effect be controlled by controlling the relative amount of Type I, Type II and/or Type III ethylenic unsaturation incorporated into the polymer. The actual amount of higher substituted conjugated diolefin required for this purpose will, of course, vary with whether the desired type of unsaturation is imparted into the polymer via 1,2addition, 1,4-addition or both and the relative amount of the monomer that adds to the polymer via both types of addition. For example, if the residual unsaturation; i.e., the unsaturation to remain after hydrogenation, will be imparted via 1,2-addition of the monomer and only one-third of the monomer will polymerize via 1,2-addition, three times as much of the higher substituted conjugated diolefin will be required to achieve the desired amount of residual unsaturation than if 100% of the monomer added via 1,2-addition. Similarly, if the residual unsaturation is imparted via 1,4-addition and only two-thirds of the monomer polymerizes via 1,4-addition, 1.5 times as much of the more substituted monomer will be required to achieve the desired unsaturation than would be required if 100% of the monomer added via 1,4-addition. In those cases where the residual unsaturation is imparted via both 1,2- and 1,4-addition, the amount of monomer required would be proportional to the amount of unsaturation desired. In this regard, it should again be noted that allowance must also be made for Type I and/or Type II ethylenic unsaturation that should be hydrogenated but remains unsaturated after hydrogenation (up to about 10%) and for any Type II or Type III that should remain unhydrogenated but is hydrogenated after hydrogenation (again, up to about 10%).

In general, hydrogenation in the method of this invention may be accomplished with any of the hydrogenation catalysts known in the prior art to be selective as between ethylenic unsaturation and aromatic unsaturation. In general, such catalysts are prepared by combining a Group VIII metal carboxylate or alkoxide and an alkyl or hydride of a metal selected from Groups I-A, II-A and III-B of Medeleev's Periodic Table of the Elements. Hydrogenation catalysts of this type are taught, for example, in U.S. Pat. Nos. 3,541,064; 3,595,942; 3,700,633 and 4,028,485, the disclosure of which patents are herein incorporated by reference. Of the Group VIII metals, those of the so-called Iron Group; viz., iron, cobalt and nickel are particularly effective. Of the Group I-A, II-A and III-B metals, lithium, magnesium and aluminum are particularly effective.

In general, the hydrogenation will be accomplished in a suitable solvent. Suitable solvents include, but are not limited to, hydrocarbons such as paraffins, cycloparaffins, alkyl-substituted cycloparaffins, aromatics, alkyl-substituted aromatics and the like containing from about 4 to about 20 carbon atoms per molecule. Suitable solvents, then, include benzene, toluene, cyclohexane, methyl cyclohexane, n-butane, n-hexane, n-heptane and the like.

In general, and when the selective hydrogenation is to be accomplished such that Type I ethylenic unsaturation is to be hydrogenated while Type II ethylenic unsaturation remains unsaturated, the selective hydrogenation will be accomplished at a temperature within the range from about 40° C. to about 110° C., at a hydrogen partial pressure within the range from about 100 psig to about 1,000 psig, at a catalyst concentration within the range from about $1 \times 10^{-3}$ to about $2 \times 10^{-2}$ mmoles of Group VIII metal per gram of polymer with a holding time within the range from about 10 to about 300 minutes. When the selective hydrogenation is to be accomplished such that Type II ethylenic unsaturation is to be hydrogenated while Type III ethylenic unsaturation remains unsaturated the hydrogenation will be accomplished at a temperature within the range from about 40° C. to about 110° C., at a hydrogen partial pressure within the range from about 100 psig to about 1,000 psig, at a catalyst concentration within the range from about $5 \times 10^{-3}$ to about $1 \times 10^{-1}$ mmoles of Group VIII metal per gram of polymer with a holding time within the range from about 10 to about 300 minutes. When the selective hydrogenation is to be accomplished such that Type I ethylenic unsaturation is hydrogenated while Type III ethylenic unsaturation is to remain unsaturated after hydrogenation, the hydrogenation may be accomplished at a temperature within the range from about 40° C. to about 110° C., at a hydrogen partial pressure within the range from about 100 psig to about 1,000 psig, at a catalyst concentration within the range from about $1 \times 10^{-3}$ to about $1 \times 10^{31\ 1}$ mmoles of Group VIII metal per gram of polymer with a holding time within the range from about 10 to about 300 minutes. It will, of course, be appreciated that the conditions required to selectively hydrogenate as between Type II ethylenic unsaturation and Type III ethylenic unsaturation would result in hydrogenation of any Type I ethylenic unsaturation in the polymer. As will be apparent from the operating conditions thus specified, care must be exercised to effect selective hydrogenation as between Type I and Type II ethylenic unsaturation. Little care, however, need be exercised to effect selective hydrogenation as between Types I and III and Type II and III. This is due to the fact that Type III ethylenic unsaturation is difficult to hydrogenate and, in fact, will not hydrogenate at any of the conditions commonly employed for hydrogenating ethylenically unsaturated polymers.

The selectively hydrogenated polymers produced with the method of hydrogenating of this invention will be useful in any of the applications in which hydrogenated polymers containing conjugated diolefin monomer units are known to be useful in the prior art. In this regard, it should be noted that since at least 60% of the initial ethylenic unsaturation contained in the polymer is hydrogenated, the polymers produced in the process of this invention will exhibit improved weatherability and improved thermal stability. Moreover, since the polymers produced in the hydrogenation process of this invention may have up to 40% residual ethylenic unsaturation, the polymer products may be cured via cross-linking through the residual ethylenic unsaturation. Further, the residual unsaturation contained in the polymers produced with the process of this invention will enable functionalization of the polymer in that portion of the polymer containing the residual ethylenic unsaturation. Such functionalization may be accomplished, for example, through the so called ENE reaction or by grafting with a free radical initiator. The hydrogenated polymers produced with the hydrogenation process of this invention may be used as a modifier in thermosetting polyester resin compositions and as a modifier in engineering thermoplastic compositions. The hydrogenated polymer may also be used in adhesive compositions, paints and the like.

PREFERRED EMBODIMENT

In a preferred embodiment of the present invention, a block copolymer containing at least one polymeric block containing monoalkenyl aromatic hydrocarbon monomer units and at least one polymeric block containing monomer units of at least two different randomly polymerized conjugated diolefins will be selectively hydrogenated to produce a block copolymer containing residual ethylenic unsaturation in the polymeric blocks containing the conjugated diolefin monomer units. In the preferred embodiment, at least one of the conjugated diolefins will be unsubstituted such that said unsubstituted conjugated diolefin imparts at least some Type I ethylenic unsaturation into the polymer. At least one other of said conjugated diolefins will be substituted such that said substituted conjugated diolefin imparts at least some Type II ethylenic unsaturation into the polymer. In a most preferred embodiment, the block copolymer will contain three polymeric blocks, two of which are polystyrene and one of which is a butadiene-isoprene random copolymer. In the most preferred embodiment, then, the triblock copolymer will be selectively hydrogenated such that at least 90% of the Type I ethylenic unsaturation imparted into the polymer via both 1,2- and 1,4-addition of butadiene and at least 90% of the Type I ethylenic unsaturation imparted into the polymer as a result of 3,4-addition of the isoprene into the polymer is hydrogenated while at least about 90% of the Type II ethylenic unsaturation imparted into the polymer via 1,4-addition of the isoprene will remain unsaturated after the hydrogenation is complete. In both the preferred and most preferred embodiments, at least about 80% (on a mole basis) of the ethylenic unsaturation imparted by the conjugated diolefin having the greater number of total substituents on the 2 and 3 carbon atoms thereof will be imparted into the polymer as a result of 1,4-addition of the more substituted conjugated diolefin into the conjugated diolefin block. In both the preferred and most preferred embodiments, a sufficient amount of the more substituted conjugated diolefin, isoprene in the most preferred embodiment, will be copolymerized into the conjugated diolefin blocks to permit control of the amount of residual unsaturation contained in said conjugated diolefin polymeric blocks within the range from about 2% to about 20% (on a mole basis) of that which was contained in the conjugated diolefin blocks prior to the selective hydrogenation. In the preferred embodiment, the substitutions used to sterically hinder hydrogenation of the ethylenic unsaturation will be alkyl radicals having 1 to about 6 carbon atoms, most preferably lower alkyl groups ($C_1$-$C_3$) and the substitutions will be positioned on either the 2 or 3 carbon atoms or both the 2 and 3 carbon atoms.

In both the preferred and most preferred embodiments, the hydrogenation will be accomplished in solution with a suitable solvent and with a hydrogenation catalyst formed by combining a nickel carboxylate and an aluminum alkyl. In a preferred embodiment, the alkyl portion of the carboxylate will contain from about 2 to about 20 carbon atoms and the aluminum alkyl will be a trialkyl, each alkyl group having from 1 to about 4 carbon atoms. In a most preferred embodiment, the nickel carboxylate will be nickel-2-ethylhexanoate and the aluminum alkyl will be triethyl aluminum. In a preferred embodiment, the hydrogenation will be accomplished at a temperature within the range from about 60° C. to about 90° C., at a hydrogen partial pressure within the range from about 500 psig to about 700 psig, at a nickel concentration within the range from about $1.5 \times 10^{-3}$ mmoles to about $8 \times 10^{-3}$ mmoles of nickel per gram of polymer and with a nominal holding time within the range from about 50 to about 250 minutes. In a most preferred embodiment, the hydrogenation will be accomplished at a temperature within the range from about 70° C. to about 90° C., at a hydrogen partial pressure within the range from about 600 psig to about 700 psig, at a catalyst concentration within the range from about $2.1 \times 10^{-3}$ mmoles to about $4.2 \times 10^{-3}$ mmoles of nickel per gram of polymer and with a nominal holding time within the range from about 120 to about 210 minutes.

Having thus broadly described the invention and a preferred and most preferred embodiment thereof, it is believed that the same will become even more apparent by reference to the following examples. It will be appreciated however, that the examples are presented solely for purposes of illustration and should not be construed as limiting the invention.

EXAMPLE 1

In this example, a diblock copolymer containing a polystyrene block having a weight-average molecular weight of 18,100 and a butadiene-isoprene copolymer block having a weight-average molecular weight of 83,500 was selectively hydrogenated such that at least 90% of the ethylenic unsaturation initially imparted into the polymer by both 1 2- and 1,4-addition of the butadiene (both Type I) and substantially all of the ethylenic unsaturation initially imparted by 3,4-addition of the isoprene (Type I) was converted (saturated) while at least 90% of the ethylenic unsaturation imparted by 1,4-addition of the isoprene (Type II) into the polymer remained unsaturated. Substantially all of the aromatic unsaturation contained in the polymer also remained unsaturated. The butadiene-isoprene copolymer block contained 15.9 mole % isoprene (11.9 mole % 1,4-addition and 4.0 mole % 3,4-addition). In this example, the hydrogenation was accomplished by dissolving 12.4 lbs of the block copolymer in 62.4 lbs of cyclohexane and then adding 1.02 g of nickel catalyst ($3.0 \times 10^{-3}$ mmoles of nickel per g of polymer) to the solution. The solution was then heated to 70° C. and held for 1 hour and then heated to 90° C. Hydrogen at a partial pressure of 700 psig was maintained for a total period of 4.5 hours (1 hour at 70° C. and 3.5 hours at 90° C.). Samples were periodically withdrawn from the reactor and analyzed, using an ozone titration technique, to determine the amount of ethylenic unsaturation remaining in the polymer at the time the sample was taken. The value obtained was then subtracted from 100 to determine the percent of initial ethylenic unsaturation actually hydrogenated. The results obtained from the run completed in this example are summarized in the Table following Example 3.

EXAMPLE 2

In this example, the run of Example 1 was repeated except that the amount of nickel catalyst added was reduced to 0.85 g ($2.5 \times 10^{-3}$ mmoles of nickel per g of polymer) and the run was continued for 3 hours rather than 4.5 hours (1 hour at 70° C. and 2.5 hours at 90° C.). The results obtained in the run of this example are also summarized in the Table following Example 3.

EXAMPLE 3

In this example the run of Example 1 was repeated except that the amount of nickel catalyst added was reduced to 0.68 g ($2.0 \times 10^{-3}$ mmoles of nickel per g of polymer) and the run was continued for 4.5 hours as in Example 1. The results obtained in the run of this example are also summarized in the following Table:

TABLE

| Hydrogenation Time, hrs | % Hydrogenation at time Indicated | | |
|---|---|---|---|
| | $3.0 \times 10^{-3}$ mmoles Ni | $2.5 \times 10^{-3}$ mmoles Ni | $2.0 \times 10^{-3}$ mmoles Ni |
| 1.0 | 78 | 64.8 | 69 |
| 1.25 | — | 83.6 | — |
| 1.5 | — | 85.7 | — |
| 1.75 | — | 87.5 | — |
| 2.0 | 85 | 87.5 | 81 |
| 2.25 | — | 88.8 | — |
| 2.5 | — | 89.9 | — |
| 2.75 | — | 89.5 | — |
| 3.0 | 88 | 89.8 | 85 |
| 3.5 | 89 | — | 86 |
| 4.0 | 89 | — | 86 |
| 4.5 | 89 | — | 86 |

As will be apparent from the data summarized in the preceding Table, the extent of hydrogenation achieved using both $3.0 \times 10^{-3}$ mmoles nickel per gram of polymer, and $2.5 \times 10^{-3}$ mmoles nickel per gram of polymer, corresponds very closely to that which would be expected from a complete conversion or saturation of all of the ethylenic unsaturation in the polymer except that resulting from 1,4-addition of the isoprene monomer into the polymer. The extent of hydrogenation achieved with $2.0 \times 10^{-3}$ mmoles nicke per g of polymer, on the other hand, corresponds to something less than complete conversion of the easier to hydrogenate unsaturation. Even with $2.0 \times 10^{-3}$ mmoles nickel per g of polymer, however, the extent of hydrogenation remained very controllable.

While the present invention has been described and illustrated by reference to particular embodiments thereof, it will be appreciated by those of ordinary skill in the art that the same lends itself to variations not necessarily described or illustrated herein. For this reason, then, reference should be made solely to the appended claims for purposes of determining the true scope of the present invention.

Having thus described and illustrated the invention, what is claimed is:

1. A method for preparing a selectively hydrogenated copolymer having a residual ethylenic unsaturation of at least 2 and no more than about 20 percent, the method comprising:
   (a) providing an unsaturated copolymer comprising monomer units of at least two different conjugated diolefins, at least one of said conjugated diolefins being an unsubstituted linear conjugated diolefin capable of imparting Type I ethylenic unsaturation to the copolymer and the other of said conjugated diolefins selected from monomers capable of imparting 2 to about 20%, based on total copolymer ethylenic unsaturation, Type II ethylenic unsaturation;
   (b) contacting said unsaturated copolymer, in solution, at a temperature within range of about 40° C. to about 110° C., with hydrogen at a partial pressure within range of from about 100 psig to about 1000 psig in the presence of an amount of a selective hydrogenation catalyst and for a time effective for selective hydrogenation of at least about 90% of the Type I and less than about 10% of the Type II ethylenic unsaturation; and
   (c) recovering a selectively hydrogenated copolymer having a residual ethylenic unsaturation of at least 2 and not more than about 20 percent.

2. The method of claim 1 wherein said selective hydrogenation catalyst is obtained by combining a Group VIII metal compound selected from the Group consisting of nickel alkoxides, cobalt alkoxides, nickel carboxylates, cobalt carboxylates and mixtures thereof with an aluminum alkyl.

3. The method of claim 2 wherein said Group VIII metal compound is a carboxylate and the hydrocarbyl portion of the carboxylate contains from about 2 to about 20 carbon atoms.

4. The method of claim 3 wherein said aluminum alkyl is an aluminum trialkyl, each alkyl group containing from 1 to about 4 carbon atoms.

5. The method of claim 4 wherein said Group VIII metal compound is nickel-2-ethylhexanoate.

6. The method of claim 2 wherein at least one of said conjugated diolefins is unsubstituted at the 2 and 3 carbon atoms end at least one other is substituted at the 2 carbon atom.

7. The method of claim 6 wherein one of said conjugated diolefins is butadiene and another is isoprene.

8. The method of claim 2 wherein at least one of said conjugated diolefins contains no substitution at the 2, 3 and 4 carbon atoms and at least one other contains a substitution at the 3 carbon atom thereof.

9. The method of claim 2 wherein at least one of said conjugated diolefins has no substitution on the 3 and 4 carbon atoms and at least one other conjugated diolefin is substituted at the number 4 carbon atom.

10. The method of claim 9 wherein one of said conjugated diolefins is butadiene and the other is 4-methyl-1,3-pentadiene.

11. The method of claim 1 in which the hydrogen partial pressure is within the range of from about 500 psig to about 700 psig.

12. The method of claim 2 wherein said catalyst is present in an amount sufficient to provide from about $1 \times 10^{-3}$ to about $2 \times 10^{-2}$ mmoles of Group VIII metal per g of polymer and the selective hydrogenation is between Type I and Type II ethylenic unsatruation.

13. The method of claim 2 wherein said catalyst is present in an amount sufficient to provide from about $1 \times 10^{-3}$ to about $1 \times 10^{-1}$ mmoles of Group VIII metal per g of polymer and the selective hydrogenation is between Type I and Type II ethylenic unsaturation.

14. The method of claim 1 wherein said polymer comprising monomer units of at least two different conjugated diolefins is a block copolymer comprising at least one polymer block containing monoalkenyl aromatic hydrocarbon monomer units and at least one monomer block which is a conjugated diolefin copolymer containing monomer units of at least two different conjugated diolefins, one of which conjugated diolefins is more substituted at the 2, 3 and/or 4 carbon atoms than is the other.

15. The method of claim 14 wherein said selective hydrogenation catalyst is obtained by combining a Group VIII metal compound selected from the Group consisting of nickel alkoxides, cobalt alkoxides, nickel carboxylates, cobalt carboxylates and mixtures thereof with an aluminum alkyl.

16. The method of claim 15 wherein said Group VIII metal compound is a carboxylate and the hydrocarbyl portion of the carboxylate contains from about 2 to about 20 carbon atoms.

17. The method of claim 16 wherein said aluminum alkyl is an aluminum trialkyl, each alkyl group containing from 1 to about 4 carbon atoms.

18. The method of claim 17 wherein said Group VIII metal compound is nickel-2-ethylhexanoate.

19. The method of claim 15 wherein at least one of said conjugated diolefins is unsubstituted at the 2 and 3 carbon atoms and at least one other is substituted at the 2 carbon atom.

20. The method of claim 19 wherein one of said conjugated diolefins is butadiene and at least one is isoprene.

21. The method of claim 15 wherein at least one of said conjugated diolefins contains no substitution at the 2, 3 and 4 carbon atoms and at least one other contains a substitution at the 3 carbon atom thereof.

22. The method of claim 15 wherein at least one of said conjugated diolefins has no substitution on the 3 and 4 carbon atoms and at least one other conjugated diolefin is substituted at the number 4 carbon atom.

23. The method of claim 22 wherein one of said conjugated diolefins is butadiene and the other is 4-methyl-1,3-pentadiene.

24. The method of claim 15 wherein said catalyst is present in an amount sufficient to provide from about $1 \times 10^{-3}$ to about $2 \times 10^{-2}$ mmoles of Group VIII metal per g of polymer and the selective hydrogenation is between Type I and Type II ethylenic unsaturation.

25. The method of claim 15 wherein said catalyst is present in an amount sufficient to provide from about $1 \times 10^{-3}$ to about $1 \times 10^{-1}$ mmoles of Group VIII metal per g of polymer and the selective hydrogenation is between Type I and Type III ethylenic unsaturation.

26. A selectively hydrogenated copolymer prepared by the process of claim 1.

27. The selectively hydrogenated polymer of claim 26 wherein at least one of said conjugated diolefins is unsubstituted at the 2, 3 and 4 carbon atoms and at least one other is substituted at the 2 carbon atom.

28. The selectively hydrogenated polymer of claim 27 wherein one of said conjugated diolefins is butadiene and at least one is isoprene.

29. The selectively hydrogenated polymer of claim 26 wherein at least one of said conjugated diolefins contains no substitution at the 2, 3 and 4 carbon atoms and at least one other contains a substitution at the 3 carbon atom thereof.

30. The selectively hydrogenated polymer of claim 26 wherein at least one of said conjugated diolefins has no substitution on the 2, 3 and 4 carbon atoms and at least one other conjugated diolefin is substituted at the number 4 carbon atom.

31. The selectively hydrogenated polymer of claim 26 wherein one of said conjugated diolefins is butadiene and the other is 4-methyl-1,3-pentadiene.

32. The selectively hydrogenated polymer of claim 26 wherein said conjugated diolefin polymer is a block copolymer comprising at least one block containing monoalkenyl aromatic hydrocarbon monomer units and at least one monomer block which is a conjugated diolefin copolymer containing monomer units of at least two different conjugated diolefins, one of which conjugated diolefins is more substituted at the 2, 3 and/or 4 carbon atoms than is the other, the monomer units derived from the conjugated diolefin having he greater amount of hydrogen being selectively hydrogenated while the monomer units derived from the conjugated diolefin having the lesser amount of hydrogen remain unhydrogenated.

33. The selectively hydrogenated polymer of claim 32 wherein at least one of said conjugated diolefins is unsubstituted at the 2, 3 and 4 carbon atoms and at least one other is substituted at the 2 carbon atom.

34. The selectively hydrogenated polymer of claim 33 wherein one of said conjugated diolefins is butadiene and at least one is isoprene.

35. The selectively hydrogenated polymer of claim 32 wherein at least one of said conjugated diolefins has no substitution on the 2, 3 and 4 carbon atoms and at least one other conjugated diolefin is substituted at the number 4 carbon atom.

36. The selectively hydrogenated polymer of claim 35 wherein one of said conjugated diolefins is butadiene and the other is 4-methyl-1,3-pentadiene.

* * * * *